United States Patent [19]

Krounbi et al.

[11] Patent Number: 5,005,096

[45] Date of Patent: Apr. 2, 1991

[54] MAGNETORESISTIVE READ TRANSDUCER HAVING HARD MAGNETIC SHUNT BIAS

[75] Inventors: Mohamad T. Krounbi, San Jose; Otto Voegeli, Morgan Hill, Po-Kang Wang, San Jose, all of Calif.

[73] Assignee: International Business Machines Corporation, Armonk, N.Y.

[21] Appl. No.: 287,970

[22] Filed: Dec. 21, 1988

[51] Int. Cl.⁵ ............................................. G11B 5/127
[52] U.S. Cl. ..................................................... 360/113
[58] Field of Search ........................................ 360/113

[56] References Cited

U.S. PATENT DOCUMENTS 3,840,898 10/1974 Bajorek et al. .
4,639,806 1/1987 Kira et al. .
4,663,585 5/1987 Tsang .
4,785,366 11/1988 Krounbi et al. ................. 360/113
4,879,619 11/1989 Fontana et al. ................. 360/113

Primary Examiner—A. J. Heinz
Assistant Examiner—Jefferson Evans
Attorney, Agent, or Firm—Otto Schmid, Jr.

[57] ABSTRACT

A magnetoresistive (MR) read transducer comprising an MR layer having passive end regions separated by a central active region. A longitudinal bias is produced by a thin film of hard magnetic material in the end regions only, and the thin film of hard magnetic material is spaced from the MR layer by a nonmagnetic spacer layer so that a magnetostatic longitudinal bias is produced of a level to maintain the passive end regions of the MR layer in a stable state.

15 Claims, 2 Drawing Sheets

MAGNETORESISTIVE READ TRANSDUCER HAVING HARD MAGNETIC SHUNT BIAS

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

The prior art also teaches that in order for an MR element to operate optimally, two bias fields should be provided. In order to bias the material so that its response to a flux field is linear, a transverse bias field is generally provided. This bias field is normal to the plane of the magnetic media and parallel to the surface of the planar MR element. Commonly assigned U.S. Pat. No. 3,840,898 describes an MR sensor in which transverse bias is produced of a level sufficient to bias the head to the most linear range of the R-H characteristic curve. The bias is produced by a hard magnetic bias layer which is separated from the MR layer by an insulating layer, and the layer of permanent magnet material extends over the entire MR sensor.

The other bias field which is usually employed with MR elements is referred to in the art as the longitudinal bias field which extends parallel to the surface of the magnetic media and parallel to the lengthwise direction of the MR element. The function of the longitudinal bias field is to suppress Barkhausen noise which originates from multi-domain activities in MR elements Numerous prior art biasing methods and apparatus for MR sensors have been developed However, the drive toward increased recording density has led to the requirement for narrower recording tracks and increased linear recording density along the tracks. The small MR sensors which are necessary to meet these requirements cannot be made with the use of the prior art techniques.

The conceptual solution to these prior art problems was attained only recently through the implementation of patterned longitudinal bias. This solution is described and claimed in the commonly assigned U.S. Pat. No. 4,663,685. Briefly, this invention advocates the creating of appropriate single domain states directly in the end regions only of the MR layer. This can be achieved by producing a longitudinal bias in the end regions only of the MR layer to maintain the end regions in a single domain state and these single domain states induce a single domain state in the central region of the MR layer. In a specific embodiment of this concept, the longitudinal bias is provided by means of exchange coupling between an antiferromagnetic material and a soft magnetic material.

U.S. Pat. No. 4,639,806 describes an MR sensor in which longitudinal bias is provided by layers of ferromagnetic material, which are in contact with the MR element in the end regions coextensive with the electrical leads, and provide longitudinal bias by means of exchange coupling between the layers of ferromagnetic material and the MR element so that the MR element is magnetized in a particular direction along the MR element However, this may have a problem with the permanence of bias since the intrinsic coercivity of the hard-bias film is substantially quenched when exchange coupled to the soft magnetic MR sensor. A second problem is caused by the magnetic flux from the hard-bias film since the added flux causes a longitudinal bias which adversely affects the transverse sensitivity profile and may therefore limit narrow-track extendibility of this approach.

No prior art is known in which a hard-bias film is coupled magnetostatically to an MR sensor in the end regions only.

SUMMARY OF THE INVENTION

It is therefore the principal object of this invention to provide a hard magnetic bias for a magnetoresistive (MR) element having improved bias permanence.

It is another object of this invention to provide a hard magnetic bias for an MR element having optimal longitudinal biasing of the active region of the MR element.

In accordance with the invention, the MR read transducer comprises a thin film of MR conductive layer formed of magnetic material, the MR layer having passive end regions separated by a central active region. A longitudinal bias is provided in the passive end regions of the MR layer by a thin film of hard magnetic material in the end regions only, which is parallel to, but spaced from, the MR layer with the longitudinal bias being of a level sufficient to invert the magnetization direction in the passive end regions of the MR layer.

The spacing of the thin film of hard magnetic material is maintained by a nonmagnetic spacer layer between the thin film of hard magnetic material and the end region of the MR layer. The thickness of the thin film of hard magnetic material can be chosen to achieve any desired flux ratio between the flux in the end regions of the MR layer and the longitudinal flux of the active region of the MR layer.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
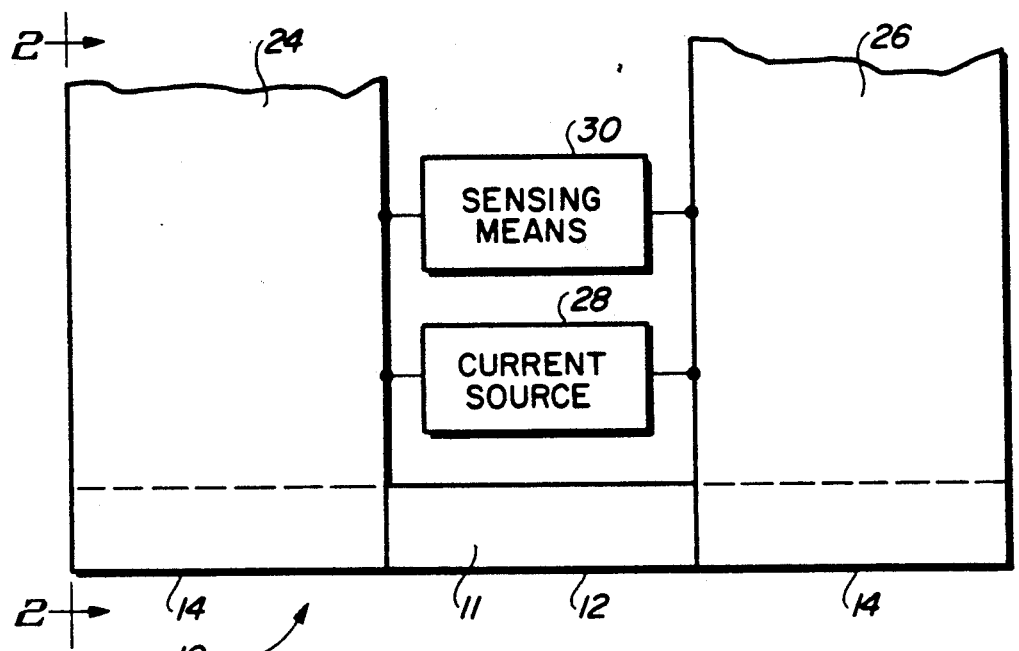
FIG. 1 is a plan view of a specific embodiment of a magnetoresistive (MR) transducer according to the present invention.
Figure 2:
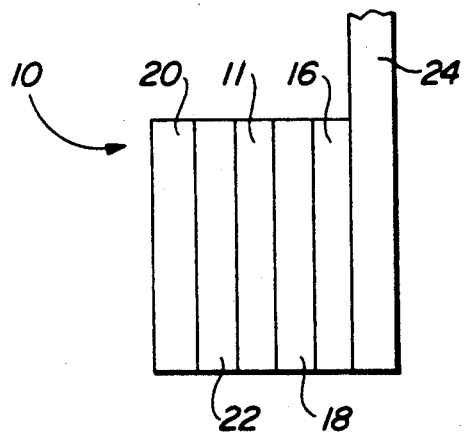
FIG. 2 is a section view taken along lines 2—2 of FIG. 1.
Figure 3:
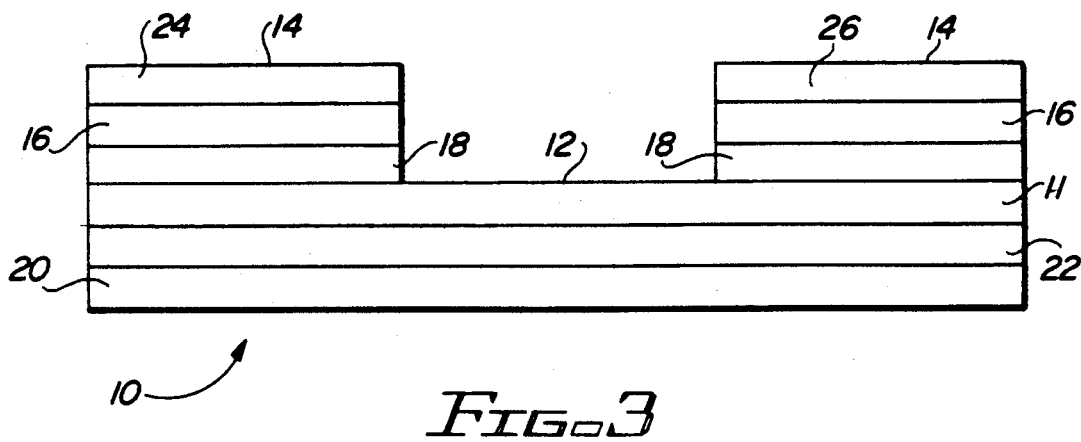
FIG. 3 is an end view of the MR transducer of FIGS. 1 and 2.

The magnetoresistive (MR) read transducer utilizes an MR sensor 10 (FIG. 1, 2 and 3), and the MR sensor 10 can be divided into two regions, the central active region 12, where actual sensing of data is accomplished, and end regions 14. The invention recognizes that the two regions should be biased in different manners with longitudinal bias only in the end regions 14 and longitudinal bias and transverse bias in the active region 12. The longitudinal bias is produced by a hard magnetic layer 16 that is parallel to but spaced from the MR sensor layer 11 by a nonmagnetic spacer layer 18. The transverse bias is produced by soft magnetic layer 20 which is separated from the MR layer 11 by a thin nonmagnetic spacer layer 22 whose purpose is to prevent, within the active central region 12, a magnetic exchange bias between the MR layer 11 and the soft magnetic film layer 20. Conductor leads 24 and 26 serve as the electrical path to conduct bias current from current source 28 to the MR sensor and to conduct the output signal to an external sensing means 30. The distance between the inner edges of conductor leads 24 and 26 comprises the part of the active region 12 over which the output signal is sensed.

Figure 5:
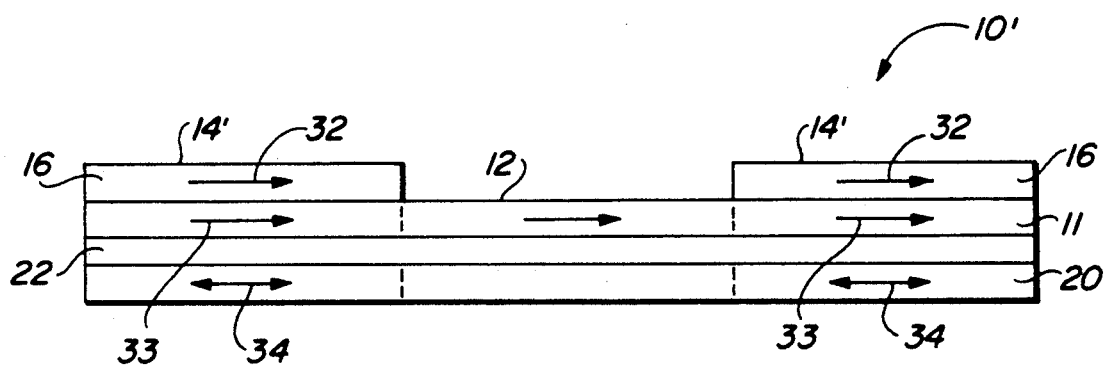
FIG. 5 is a sketch showing the magnetization configuration for a prior art MR sensor.

In the prior art hard magnetic bias design, as shown in FIG. 5, the passive end segments 14' produce an excessive amount of flux as indicated by arrows 32 and 34, where arrow 32 represents the magnetization h due to the hard magnetic layer 16, arrow 33 represents the magnetization 1 due to the MR layer 11, and arrow 34 represents the magnetization t due to the soft magnetic layer 20, where the individual magnetizations are normalized to that of the MR layer 11. The dotted end to the left on arrow 34 represents the possible ambiguity in the soft film magnetization. As initialized, the magnetization is oriented to the right. However, the thickness of spacer layer 22 and the length of passive end regions 14' are generally chosen so that the soft film magnetization in the end regions 14' is not conducive to a spontaneous reversal of magnetization It can be seen that, in the embodiment shown in FIG. 5, the magnetization in the end regions 14' of MR sensor 10' is $h+1\pm t$. In order to minimize the flux coming from end regions 14', one is forced to employ an undesirably thin hard bias film.

Figure 4:
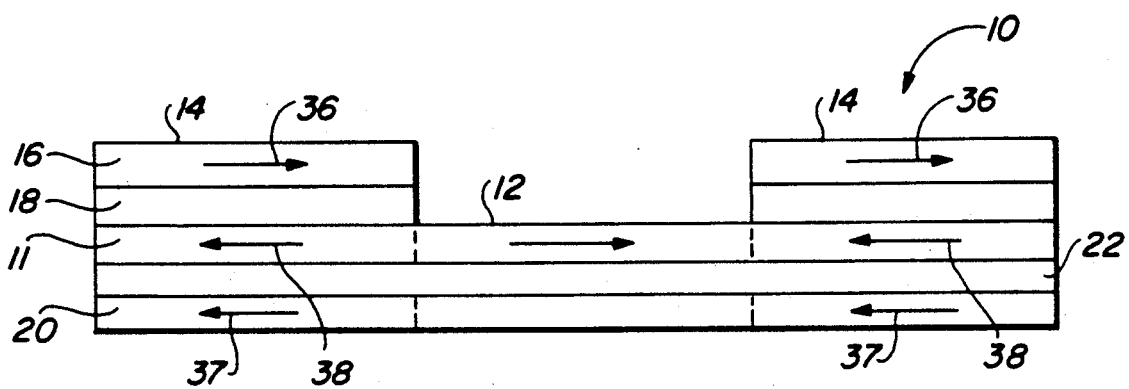
FIG. 4 is a sketch showing the magnetization configuration for the MR sensor embodying the invention.

As shown in FIG. 4, the hard magnetic shunt bias of the present invention does not have this problem since the magnetization from the end region 14 of the MR element 11 (normalized to 1), represented by arrow 38, subtracts from the hard bias layer magnetization h, as represented by arrow 36. The magnetization t, from the end region 14 of the soft magnetic layer 20, represented by arrow 37, also subtracts from the magnetization produced by the hard bias layer 16. In this case, the magnetization in the end regions 14 of MR sensor 10 is $h-1-t$. By the use of this embodiment, any desired longitudinal bias can be achieved by choosing the appropriate thickness for the hard magnetic layer 16. The longitudinal bias in the end regions 14 is preferably of a level sufficient to maintain the central region of the MR element in a single domain state.

Suitable magnetostatic coupling is obtained by making the passive end regions 14 sufficiently short and the spacing 18 small compared to its length. The spacer 18 thickness should be large enough to prevent interfacial interactions between the hard bias film 16 and the MR sensor layer 11. Otherwise, the increase in coercivity of th MR sensor layer segment may impair a self-initialization of this structure. A separation in the range of 500 to 2000 angstroms has been found to be suitable for this purpose Any suitable nonmagnetic material which is electrically conductive may be used for spacer layer 18. The preferred material is taken from the group of materials such as Chromium (Cr), tungsten (W), niobium (Nb) and tantalum (Ta), for example, which, when used as an underlayer, aid in the growth characteristics of the hard bias film 16 so that a higher coercivity is obtained. The hard magnetic layer 16 may be selected from a number of cobalt alloys of appropriate characteristics such as Co Cr, Co Ni Cr and Co Pt Cr alloys, for example. In a specific embodiment, a Cr spacer layer 18 and a Co Pt Cr alloy hard magnetic layer 16 produced the desired magnetic characteristics for the MR sensor.

The longitudinal flux coming from the end regions 14 of the MR sensor is affected by the film configuration in these regions. The net magnetic flux is the algebraic sum of the flux from the hard bias layer 16, the MR layer 11, and the soft magnetic bias film 20. In the active region 12, the longitudinal flux is determined by the bias angle of the MR sensor layer 11. The end regions 14 should supply an amount of flux that is a compromise between sensitivity profile and stability margins. A most uniform sensitivity profile is obtained when the flux from the end regions 14 matches the longitudinal flux of the active region 12. The stability margins improve when the flux from the end regions 14 exceeds that of the active region 12. A suitable compromise for the passive/active flux ratio lies in the range of 1 to 2.

These values are readily obtainable by the present invention since the passive regions 14 now shunts (rather than contributes) a fixed amount of flux. This permits one to attain any desired longitudinal bias by the appropriate choice of hard bias film thickness. The flux from the MR layer can be calculated by the product of the magnetic moment M of the MR layer 11 material and the known thickness of the MR layer. The thickness of the hard bias layer 16 can then be calculated by taking the magnetic moment M of the hard bias layer material, the flux from the MR layer and the chosen flux ratio.

Figure 6:
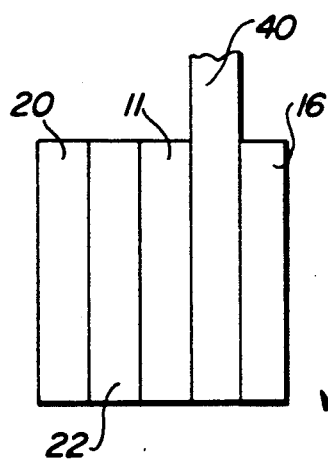
FIG. 6 is a section view of an alternate embodiment of an MR transducer embodying the invention.

An alternate embodiment of an MR sensor is shown in FIG. 6 in which a nonmagnetic layer 40 serves the dual function of providing not only the spacer layer between the hard magnetic layer 16 and the MR sensor layer 11 but also the conductor leads for the MR sensor 10''. Chromium (Cr) has a high resistivity and is suitable for nonmagnetic spacer layer 40 in systems in which high resistivity leads can be tolerated by the associated data detection circuits. In cases in which the conductor leads must have relatively low resistivity, materials such as tungsten (W) and niobium (Nb), for example, can be used for nonmagnetic layer 40.

While the invention has been particularly shown and described with reference to a preferred embodiment thereof, it will be understood by those skilled in the art that various other changes in the form and details may be made therein without departing from the spirit and scope of the invention. For example, the conductor leads may be placed on the opposite side of the MR layer, if desired, and the MR sensor may also include other layers as is known in the art such as biasing layers, for example. Alternate transverse biasing techniques such as electrical shunt bias, and barberpole can also be used in the active region 12 of the MR sensor 10.

We claim:
1. A magnetoresistive read transducer comprising:
   a thin film of magnetoresistive conductive layer formed of magnetic material, said magnetoresistive conductive layer having passive end regions separated by a central active region; and means for producing a longitudinal magnetostatic bias in the passive end regions of said magnetoresistive layer, said means for producing a longitudinal bias comprising separate thin films of hard magnetic material parallel to, but spaced from, said magnetoresistive layer, said separate thin films of hard magnetic material existing substantially in each of the passive end region only, and said separate thin films of hard magnetic material being magnetized in a chosen direction along said transducer whereby said longitudinal bias maintains said active regions of said magnetoresistive layer in a single domain state in said chosen direction along said transducer.

2. The magnetoresistive read transducer of claim 1, wherein said thin films of hard magnetic material comprises a cobalt alloy.

3. The magnetoresistive read transducer of claim 2, wherein each of said thin films of hard magnetic material is a cobalt platinum chromium alloy.

4. The magnetoresistive read transducer of claim 1, wherein the spacing of said thin films of hard magnetic material is maintained by a nonmagnetic electrically conductive spacer layer between said thin film of hard magnetic material and said magnetoresistive layer.

5. The magnetoresistive read transducer of claim 4, wherein said nonmagnetic spacer layer has a thickness within the range of 500-2000 angstroms.

6. A magnetoresistive read transducer comprising:
a thin film of magnetoresistive conductive layer formed of magnetic material, said magnetoresistive conductive layer having passive end regions separated by a central active region;
means for producing a transverse bias in said central active region of said magnetoresistive layer of a level sufficient to maintain said central region of said magnetoresistive layer in a linear response mode;
means for producing a longitudinal bias in the passive end regions of said magnetoresistive layer, said means for producing a longitudinal bias comprising separate thin films of hard magnetic material parallel to, but spaced from, said magnetoresistive layer, said separate thin films of hard magnetic material existing substantially in each of the passive end regions only, and said separate thin films of hard magnetic material being magnetized in a chosen direction along said transducer whereby said longitudinal bias maintains said passive end regions of said magnetoresistive layer in a stable reversed state thereby producing a single domain state in said central active region in said chosen direction along said transducer; and
spaced conductor means coupled to said magnetoresistive layer to define a detection region whereby sensing means connected to said conductor means can determine the resistance changes in the central active region of said magnetoresistive layer as a function of the fields which are intercepted by said magnetoresistive layer.

7. The magnetoresistive read transducer of claim 6, wherein each of said thin films of hard magnetic material comprises a cobalt alloy.

8. The magnetoresistive read transducer of claim 7, wherein each of said thin films of hard magnetic material is a cobalt platinum chromium alloy.

9. The magnetoresistive read transducer of claim 6, wherein the spacing of said thin films of hard magnetic material from said magnetoresistive layer is maintained by a nonmagnetic spacer layer between said thin film of hard magnetic material and said magnetoresistive layer.

10. The magnetoresistive read transducer of claim 9, wherein said nonmagnetic spacer layer has a thickness within the range of 500-2000 angstroms.

11. The magnetoresistive read transducer of claim 9, wherein said nonmagnetic spacer layer is a dual function layer which also serves as said spaced conductor means.

12. The magnetoresistive read transducer of claim 6 wherein said magnetic flux produced by said longitudinal bias in said end regions exceeds the longitudinal component of flux in said central region.

13. The magnetoresistive read transducer of claim 12 wherein the ratio of longitudinal flux in said end regions to said longitudinal component of flux in said central region is in the range of 1 to 2.

14. The magnetoresistive read transducer of claim 6 wherein said means for producing a transverse bias in said central region of said magnetoresistive layer comprises a soft magnetic layer spaced from said magnetoresistive layer, said soft magnetic layer extending over both said end regions and said central region of said magnetoresistive layer.

15. The magnetoresistive read transducer of claim 14 wherein the magnetization produced by said means for producing a longitudinal bias is chosen of a level so that the magnetization state in the end regions of said magnetoresistive layer and said soft magnetic layer are of the same direction but both being opposite to the magnetization direction in the active region of the magnetoresistive layer in the unbiased state.

* * * * *